I. C. WOODWARD.
LOCKING SCREW THREAD.
APPLICATION FILED FEB. 3, 1920.

1,369,156.

Patented Feb. 22, 1921.

WITNESSES

INVENTOR
IRVING C. WOODWARD.
BY
ATTORNEYS.

UNITED STATES PATENT OFFICE.

IRVING C. WOODWARD, OF CHICAGO, ILLINOIS, ASSIGNOR TO EUGENE A. WOODWARD, OF CHICAGO, ILLINOIS.

LOCKING SCREW-THREAD.

1,369,156.  Specification of Letters Patent.  Patented Feb. 22, 1921.

Application filed February 3, 1920. Serial No. 356,018.

*To all whom it may concern:*

Be it known that I, IRVING C. WOODWARD, a citizen of the United States of America, and a resident of Chicago, county of Cook, and State of Illinois, have invented certain new and useful Improvements in Locking Screw-Threads, of which the following is a specification.

The main objects of this invention are to provide an improved form of screw thread which, after it has been formed with a uniform pitch, may more easily than a standard thread have the distance from the center of one thread to the center of the next thread increased or decreased either through the threaded member's entire length or part of it, and which will frictionally lock together two coacting threaded members when at least one of them has this improved thread and when one of them has either a uniformly greater or less pitch than the other through its entire threaded length or has a greater or less difference in the distance of the center of one thread to the center of the next thread through only a part of its threaded length.

A specific embodiment of this invention is shown in the accompanying drawings in which—

Figure 1:
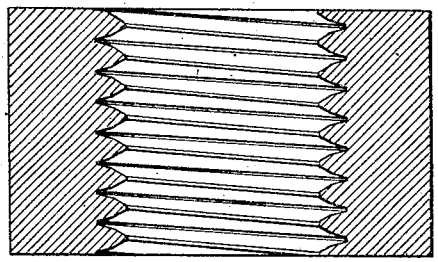

Figure 1 is a longitudinal section of a nut provided with the improved screw-thread designed for use with a bolt having the usual U. S. Form thread.

Figure 2:
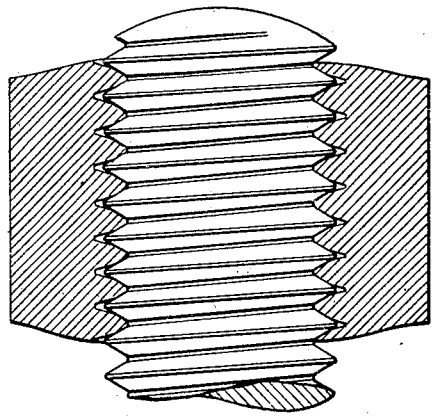

Fig. 2 is a similar section showing the nut in position on the bolt and indicating in an exaggerated way the expansion of the thread helix of the nut which causes it to lockingly grip the threads of the bolt.

Figure 3:
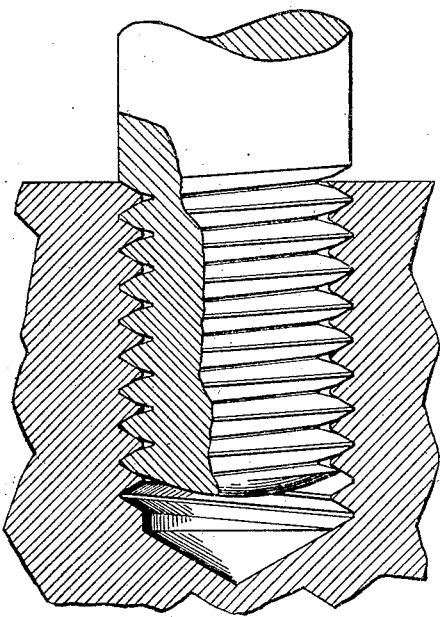

Fig. 3 is a sectional view showing the improved screw-threaded applied to a stud bolt designed to coöperate with a tapped hole having U. S. Form screw-threads.

Figure 4:
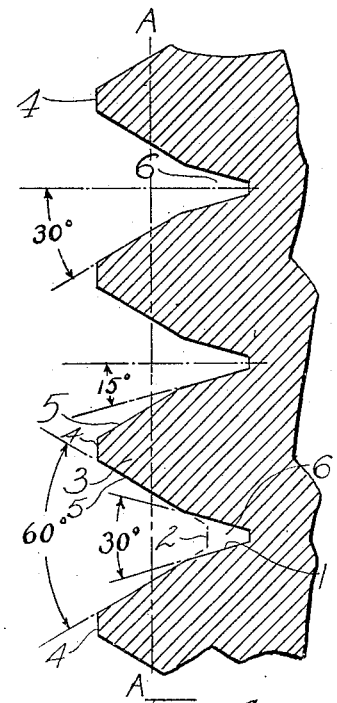

Fig. 4 is an enlarged sectional detail of the screw thread illustrating the invention as applied to the usual U. S. Form thread.

In the form shown in the drawing, both of the interfitting threads are of standard shape with the exception that the thread grooves of one of the members (in Fig. 2, the nut, and in Fig. 3, the bolt) are deepened to permit of a slight axial yielding of its thread helix when the male and female members, which are made with a different uniform pitch of threads are forcibly made to coact. Both members may if desired have threads with deepened thread grooves.

Likewise, both of the interfitting members may originally have threads of the same uniform pitch and of standard shape with the exception that the thread grooves of one of the members are deepened to permit of a slight axial yielding of its thread helix, and afterward one of the members may have the distance from center to center of all or a part of its threads decreased or increased so as to produce locking friction when the members are forcibly made to coact.

In Fig. 4 of the drawing, the special thread with deepened thread grooves is shown in cross-section and the form of a co-acting U. S. F. thread is indicated in dotted outline with its apex at 2. The pitch line (or cylinder) of both the standard and special threads is indicated by broken line A—A, this being exactly half way between the root and crest lines of the standard thread but closer to the crest than to the root of the special thread.

If both members were threaded with U. S. Form threads, the distance between the apex 2 of one thread and the bottom of the groove of the other thread would be considerably less than that indicated, namely, merely enough for clearance.

The special thread, as shown, has a greater depth than a standard thread so that the distance between the center of one thread to the center of any other thread may be more easily changed.

In some cases when the special thread coacts with a U. S. Form thread, sufficient depth of thread at the bottom may be obtained by continuing to a sharp V, and at the same angle as the sides of the U. S. F. thread, the walls of the special thread.

Generally, however, to get the required thread depth it will be necessary to have the sides 1 of the extra bottom portion 6 of grooves between threads at some angle to each other (say 30 degrees as shown in Fig. 4) less in amount than the angle between the sides 5 of the thread (60 degrees as shown in Fig. 4) adjacent to the crest.

In the case of coacting members originally made with different uniform pitch of threads, it is immaterial whether the pitch of the threads on the female member be greater or less than the pitch of those on the male member. It is, however, preferable to have more threads to the inch in the nut than on the bolt since this tends to cause the thread helix of the nut to be extended through contact with the bolt, as shown in exaggerated form in Fig. 2. Then, if through long continued use the frictional grip between the threads should become weakened, it can be restored by merely placing the nut on an anvil and striking it with a hammer in line with its axis.

In general, the special thread is preferably used only in or on one of the coacting threaded members and the other has a corresponding standard thread of uniform pitch.

The invention contemplates three ways in which coacting members may be made self-locking: (1) when the special thread is formed with the same number of threads per inch as the standard, but, before being used, has the distance between some of its threads permanently increased or decreased; (2) when the special thread on one member has a greater uniform pitch than the standard thread on the other member and (3) when the special thread on one member has a smaller uniform pitch than the standard thread on the other member.

Measured in a line corresponding to the basic pitch line of the member having a standard thread, the thickness of the special thread will be the same in all three ways and will numerically equal the thickness of the standard thread and the spaces between the standard threads.

The spaces between the special threads when formed, however, will be different in each of the three ways. In way (1), the space between threads will initially be equal to the thickness of the thread as in the standard practice; in way (2), the space between threads will be greater than the thickness of the thread, and in way (3), the space between threads will be less than the thickness of the thread.

Although the invention has been herein illustrated in conjunction with the United States standard form of thread, it will be understood that it is equally applicable to threads made in accordance with other standards, and that details of the form illustrated may be altered or omitted without departing from the spirit of this invention as defined by the following claims.

I claim:

1. A pair of interfitting members having complementary screw-threads, differing in pitch respectively, and the thread grooves of one of said members being deepened to permit the threads to yield.

2. A pair of interfitting members having complementary screw-threads differing in pitch respectively, and the thread grooves of one of said members being deepened throughout substantially the entire length thereof to permit the respective thread-helix to be expanded or contracted axially and thereby exert locking pressure on the threads of the other member.

3. A pair of interfitting members, one having a screw-thread of standard triangular form and dimensions, and the other having a similar thread but differing as to pitch and having deepened thread grooves whereby the thread-helix may yield to accommodate the difference in pitch and thereby produce a locking pressure between the threads.

4. A pair of interfitting members having complementary screw-threads uniformly differing in pitch throughout their entire length respectively, and the thread grooves of one of said members being deepened to permit the threads to yield.

5. A pair of interfitting members, the male part having a screw thread of standard triangular form, dimensions and pitch, and the female part having a similar thread but differing through a part of its length as to pitch and having deepened thread grooves whereby the threads of the female part that differ in pitch from the threads of the male part with which they coact may yield to accommodate the difference in pitch and thereby produce a locking pressure between the threads.

6. A screw thread having in cross section the same outline and area, from its crest to a place near its bottom, as the standard thread with which it may coact; and from said place near its bottom, the sides of the thread run at such angle that the depth of the special thread will be greater than the depth of the standard thread with which it may coact.

7. A screw thread having in cross section the same outline and area, from its crest to a place near its bottom, as the standard thread with which it may coact; and from said place near its bottom to the bottom of the thread, the sides of the thread run at an angle between them less than the angle between the sides adjacent to the crest.

Signed at Chicago this 30 day of Dec., 1919.

IRVING C. WOODWARD.